United States Patent
Fitzhugh et al.

(10) Patent No.: US 10,136,341 B2
(45) Date of Patent: Nov. 20, 2018

(54) WIRELESS DATA CONCENTRATOR SYSTEMS AND METHODS

(71) Applicant: Simmonds Precision Products, Inc., Vergennes, VT (US)

(72) Inventors: Christopher Fitzhugh, Essex Junction, VT (US); Michael A. Lynch, Shelburne, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 166 days.

(21) Appl. No.: 15/397,622

(22) Filed: Jan. 3, 2017

(65) Prior Publication Data
US 2018/0192301 A1    Jul. 5, 2018

(51) Int. Cl.
*H04B 7/01* (2006.01)
*H04W 24/02* (2009.01)
*H04B 17/309* (2015.01)

(52) U.S. Cl.
CPC .......... *H04W 24/02* (2013.01); *H04B 17/309* (2015.01)

(58) Field of Classification Search
CPC ............................. H04B 15/00; H04B 7/18506
USPC ........... 455/63.1, 114.2, 278.1, 296, 522, 69, 455/13.4, 410, 432.1, 39, 73, 307, 3.01; 370/329, 252, 328, 400, 311, 310; 375/148; 709/224; 244/119, 118.5
See application file for complete search history.

(56) References Cited

U.S. PATENT DOCUMENTS

| | | | |
|---|---|---|---|
| 8,472,878 B2 * | 6/2013 | LaBerge | H04W 16/14 455/114.2 |
| 8,982,784 B2 * | 3/2015 | Muller | H04Q 9/00 370/328 |
| 9,078,123 B1 | 7/2015 | Benco et al. | |
| 2001/0046855 A1 * | 11/2001 | Kil | H04W 52/20 455/421 |
| 2003/0021241 A1 * | 1/2003 | Dame | H04B 7/18506 370/321 |
| 2006/0105797 A1 * | 5/2006 | Marsan | H04W 52/367 455/522 |
| 2006/0203709 A1 * | 9/2006 | Laroia | H04L 5/0044 370/208 |
| 2006/0205356 A1 * | 9/2006 | Laroia | H04B 7/0811 455/66.1 |
| 2006/0221895 A1 * | 10/2006 | Mori | H04B 7/18506 370/328 |
| 2008/0037507 A1 * | 2/2008 | Fukumoto | H04B 1/18 370/347 |
| 2010/0075664 A1 | 3/2010 | Maucksch | |

(Continued)

OTHER PUBLICATIONS

Extended European Search Report, of the European Patent Office, dated Apr. 5, 2018, issued in corresponding European Patent Application No. 17210243.6.

*Primary Examiner* — Tan H Trinh

(74) *Attorney, Agent, or Firm* — Locke Lord LLP; Daniel J. Fiorello; Scott D. Wofsy

(57) ABSTRACT

A computer implemented method includes transmitting a transmit command to a first data concentrator to send out a predetermined signal of predetermined characteristics according to a transmission setting, receiving a received signal from at least one second data concentrator, and determining if there are any signal transmission effects between the first data concentrator and the second data concentrator based on a comparison of the predetermined signal and the received signal.

14 Claims, 1 Drawing Sheet

(56) References Cited

U.S. PATENT DOCUMENTS

| | | | |
|---|---|---|---|
| 2010/0102934 A1* | 4/2010 | Guichard | G06Q 10/08 340/10.42 |
| 2010/0177679 A1* | 7/2010 | Rudland | H04L 45/00 370/328 |
| 2010/0177813 A1 | 7/2010 | Gessner | |
| 2010/0231407 A1* | 9/2010 | Carr | G06K 19/0723 340/691.1 |
| 2010/0261451 A1* | 10/2010 | Korhonen | H04L 63/0464 455/410 |
| 2010/0309848 A1* | 12/2010 | Erceg | H04L 5/0023 370/328 |
| 2011/0130092 A1* | 6/2011 | Yun | H04W 72/085 455/39 |
| 2011/0133891 A1* | 6/2011 | Krug | G06K 7/0008 340/10.1 |
| 2011/0195656 A1* | 8/2011 | Owyang | H04W 64/00 455/3.01 |
| 2011/0208973 A1* | 8/2011 | Jimenez | G06K 17/0022 713/181 |
| 2011/0299470 A1* | 12/2011 | Muller | H04Q 9/00 370/328 |
| 2012/0054341 A1* | 3/2012 | Donaghey | H04Q 9/00 709/224 |
| 2013/0003620 A1* | 1/2013 | Dame | H01Q 1/007 370/310 |
| 2013/0007119 A1* | 1/2013 | Zarka | H04L 69/14 709/203 |
| 2013/0109397 A1* | 5/2013 | Watanabe | H04W 40/08 455/445 |
| 2013/0214909 A1* | 8/2013 | Meijers | H04W 4/029 340/10.5 |
| 2013/0329620 A1* | 12/2013 | Kim | H04W 52/0229 370/311 |
| 2014/0185536 A1* | 7/2014 | Lynn, Jr. | H04L 12/4633 370/329 |
| 2014/0213186 A1* | 7/2014 | Gage | H04W 4/21 455/41.2 |
| 2014/0241282 A1* | 8/2014 | Mueller | H04B 7/18506 370/329 |
| 2014/0269850 A1* | 9/2014 | Abdelmonem | H04L 5/0026 375/148 |
| 2014/0309811 A1* | 10/2014 | Mueller | B64D 25/00 701/2 |
| 2014/0376392 A1* | 12/2014 | Hegde | H04W 48/16 370/252 |
| 2015/0098458 A1* | 4/2015 | Shen | H04W 76/021 370/338 |
| 2016/0029409 A1* | 1/2016 | Mueller | H04W 76/025 370/329 |
| 2016/0270052 A1* | 9/2016 | Dame | H01Q 1/526 |
| 2017/0070357 A1* | 3/2017 | Kanayama | H04L 12/189 |
| 2017/0127420 A1* | 5/2017 | Bowers | H04W 72/0453 |
| 2017/0244476 A1* | 8/2017 | Merlin | H04B 7/2621 |
| 2017/0353943 A1* | 12/2017 | Skaaksrud | H04W 76/10 |
| 2018/0006467 A1* | 1/2018 | Lee | H02J 5/005 |
| 2018/0027506 A1* | 1/2018 | Pasulka | H04W 52/346 370/338 |

\* cited by examiner

WIRELESS DATA CONCENTRATOR SYSTEMS AND METHODS

BACKGROUND

1. Field

The present disclosure relates to data concentrator systems, more specifically to wireless data concentrator systems and methods.

2. Description of Related Art

Multiple wireless data concentrators (e.g., dual radio) can be deployed and networked in an aircraft. Aircraft are enclosed environments that are RF consistent when void of passengers and their luggage. There are no solutions to characterize the environment and performance of the data concentrators for installation or in actual use when there are people and luggage on board.

Such conventional methods and systems have generally been considered satisfactory for their intended purpose. However, there is still a need in the art for improved data concentrator systems and methods. The present disclosure provides a solution for this need.

SUMMARY

A computer implemented method includes transmitting a transmit command to a first data concentrator to send out a predetermined signal of predetermined characteristics according to a transmission setting, receiving a received signal from at least one second data concentrator, and determining if there are any signal transmission effects between the first data concentrator and the second data concentrator based on a comparison of the predetermined signal and the received signal. The method can include modifying the transmission setting of the first data concentrator based on the determined signal transmission effects.

Modifying the transmission setting can be for improving signal transmission between the first data concentrator and the second data concentrator. Modifying the transmission setting can include changing a signal gain output by the first data concentrator.

In certain embodiments, changing the signal gain includes increasing the signal gain. Modifying the transmission setting can include changing a frequency output by the first data concentrator.

The method can include receiving an aircraft startup signal before transmitting the transmit signal to cause the method to be performed with every aircraft startup. In certain embodiments, the method can include receiving a scheduled start signal before transmitting the transmit signal to cause the method to be executed according to a predetermined schedule.

In accordance with at least one aspect of this disclosure, a non-transitory computer readable medium includes computer executable instructions configured to cause a computer to perform the steps of any suitable embodiment of a method as described herein or any suitable portion thereof.

In accordance with at least one aspect of this disclosure, a vehicular wireless networking system includes a first data concentrator configured to transmit a predetermined signal of predetermined characteristics according to a transmission setting, a second data concentrator configured to listen for and/or receive a signal from the first data concentrator, and a network analysis module operatively connected to the first data concentrator to at least modify a transmission setting thereof. The network analysis module is operatively connected to the second data concentrator at least to receive a received signal therefrom. The network analysis module is configured to determine if there are any signal transmission effects between the first data concentrator and the second data concentrator based on a comparison of the predetermined signal and the received signal.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
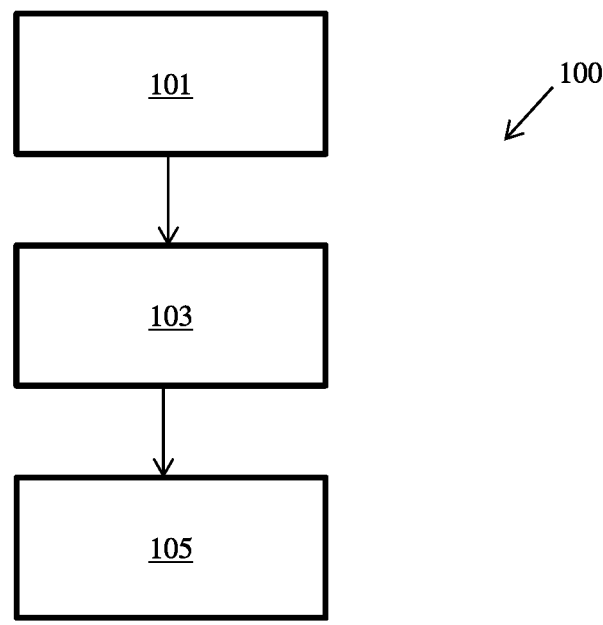
FIG. 1 is an flow diagram of an embodiment of a method in accordance with this disclosure.
Figure 2:
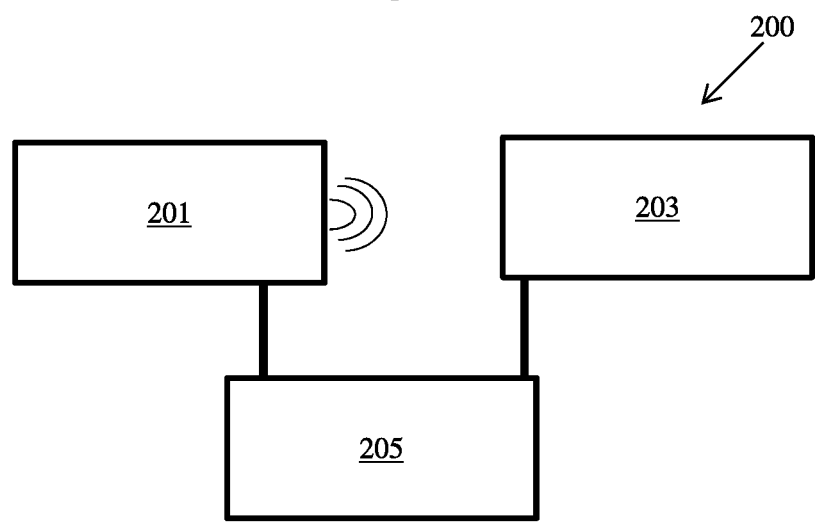
FIG. 2 is a schematic diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIG. 2. The systems and methods described herein can be used to improve signal transmission in a network (e.g., in an aircraft or other suitable vehicle), for example.

Referring to FIGS. 1 and 2, a computer implemented method 100 (e.g., as implemented by a network module 205 on system 200) includes transmitting (e.g., at block 101) a transmit command to a first data concentrator 201 to send out a predetermined signal of predetermined characteristics according to a transmission setting. The transmission setting can include any suitable transmission characteristics (e.g., gain, frequency/channel).

The method 100 includes receiving (e.g., at block 103) a received signal from at least one second data concentrator 203. The received signal can be whatever signal is received by the second data concentrator 203 during transmission of the predetermined signal from the first data concentrator 201, for example.

The method 100 can also include determining (e.g., at block 105) if there are any signal transmission effects between the first data concentrator 201 and the second data concentrator 203 based on a comparison of the predetermined signal and the received signal. The method 100 can include modifying the transmission setting of the first data concentrator 201 based on the determined signal transmission effects.

Modifying the transmission setting can be for improving signal transmission between the first data concentrator 201 and the second data concentrator 203. Modifying the transmission setting can include changing a signal gain output by the first data concentrator 201.

In certain embodiments, changing the signal gain includes increasing the signal gain. Modifying the transmission setting can include changing a frequency output by the first data concentrator 201.

The method 100 can include receiving an aircraft startup signal before transmitting the transmit signal to cause the method 100 to be performed with every aircraft startup. In certain embodiments, the method 100 can include receiving a scheduled start signal before transmitting the transmit signal to cause the method to be executed according to a predetermined schedule (e.g., at periodic times and/or after certain intervals of time).

In accordance with at least one aspect of this disclosure, a non-transitory computer readable medium includes computer executable instructions configured to cause a computer to perform the steps of any suitable embodiment of a method 100 as described herein or any suitable portion thereof. Any other suitable methods and/or portions thereof can be included as appreciated by those having ordinary skill in the art.

Referring to FIG. 2, in accordance with at least one aspect of this disclosure, a vehicular wireless networking system 200 includes a first data concentrator 201 configured to transmit a predetermined signal of predetermined characteristics according to a transmission setting. The system 200 also includes a second data concentrator 203 configured to listen for and/or receive a signal from the first data concentrator 201. The first data concentrator 201 and the second data concentrator 203 can be any suitable devices (e.g., a wireless radio data concentrator (WRDC)) configured for receiving and/or transmitting data signals in a network including any suitable hardware and/or software as appreciated by those having ordinary skill in the art.

The system 200 includes a network analysis module 205 operatively connected to the first data concentrator 201 to at least modify a transmission setting thereof. The network analysis module 205 is operatively connected to the second data concentrator 203 at least to receive a received signal therefrom.

The network analysis module 205 is configured to determine if there are any signal transmission effects between the first data concentrator 201 and the second data concentrator 203 based on a comparison of the predetermined signal and the received signal. In this regard, any changes in network environment (e.g., as a result of people and/or luggage on an aircraft) can be detected and/or counteracted.

The network analysis module 205 can include any suitable hardware and/or software as appreciated by those having ordinary skill in the art to function as described herein. It is contemplated that the network analysis module 205 can be a software module included in one or more of the data concentrators.

In certain embodiments, the network analysis module 205 can be operatively connected to the first data concentrator 201 (and/or any other suitable data concentrator) to receive signals and/or to the second data concentrator 203 (and/or any other suitable data concentrator) to transmit signals. In this regard, any suitable individual, combinations, and/or all of the data concentrators of a network can be used to determine signal transmission effects between each node.

In certain embodiments, the first and/or second data concentrators 201, 203 can have a plurality of transmitters and/or receivers which can allow for the other transmitters and/or receivers in the data concentrator to receive and evaluate the received signal. This can additionally provide an indication of a failed transmitter and/or receiver in an aircraft network. In this regard, in certain embodiments, the term "at least one second data concentrator" as used above can include one or more additional receivers of a single data concentrator.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

In embodiments as described above, one or more radio modules in one or more WRDCs can be assigned a transmit channel and begin to send broadcast messages. One or more other radio modules in the "neighborhood" of the transmitting WRDC can monitor the transmissions and record signal strength and transmission quality. Thus, embodiments allow for a multi-directional data set of path loss and/or signal quality information for communication paths on all channels between all transceiver modules.

Once the initial installation is verified and recorded, subsequent test may be performed periodically to verify continued operation of the network during normal operation. Any predetermined deviation in path loss measurement or loss of signal quality may be flagged for further investigation and possible overhaul. The collected data can be compared to model or empirical data as a reference to ensure that the network is deployed and functioning properly after installation. This process and system can be used any time the network is changed, e.g., due to a data concentrator failure.

As described above, embodiments enable modeling of signal strength and/or other characteristics (e.g., in real time on an aircraft). For example, existing WRDCs in an aircraft or other suitable location can be used to measure how the environment effects transmission and receiving of signals (e.g., signal attenuation, signal strength change). An analysis can be performed at any suitable time (e.g., before and/or during flight at any time, periodically to allow real time settings to change to maximize signal transmission).

In certain situations, embodiments can be used to determine if someone is trying to hack into the system or corrupt the system by analyzing or injecting signal type and characteristics. For example, if received signal is sufficiently dissimilar as the predetermined signal, it can be defined as a security breach and alert a user. Any other suitable use or uses are contemplated herein.

The methods and systems of the present disclosure, as described above and shown in the drawings, provide for wireless data concentrator systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A computer implemented method, comprising:
transmitting a transmit command to a first data concentrator to send out a predetermined signal of predetermined characteristics according to a transmission setting;
receiving a received signal from at least one second data concentrator;
determining if there are any signal transmission effects between the first data concentrator and the second data concentrator based on a comparison of the predetermined signal and the received signal; and
receiving an aircraft startup signal before transmitting the transmit command to cause the method to be performed with every aircraft startup.

2. The method of claim 1, further comprising modifying the transmission setting of the first data concentrator based on the determined signal transmission effects.

3. The method of claim 2, wherein modifying the transmission setting is for improving signal transmission between the first data concentrator and the second data concentrator.

4. The method of claim 2, wherein modifying the transmission setting includes changing a signal gain output by the first data concentrator.

5. The method of claim 4, wherein changing the signal gain includes increasing the signal gain.

6. The method of claim 2, wherein modifying the transmission setting includes changing a frequency output by the first data concentrator.

7. A non-transitory computer readable medium, comprising computer executable instructions configured to cause a computer to perform the steps of a method, the method comprising:
transmitting a transmit command to a first data concentrator to send out a predetermined signal of predetermined characteristics according to a transmission setting;
receiving a received signal from at least one second data concentrator;
determining if there are any signal transmission effects between the first data concentrator and the second data concentrator based on a comparison of the predetermined signal and the received signal; and
receiving an aircraft startup signal before transmitting the transmit command to cause the method to be performed with every aircraft startup.

8. The non-transitory computer readable medium of claim 7, wherein the method further includes modifying the transmission setting of the first data concentrator based on the determined signal transmission effects.

9. The non-transitory computer readable medium of claim 8, wherein modifying the transmission setting is for improving signal transmission between the first data concentrator and the second data concentrator.

10. The non-transitory computer readable medium of claim 8, wherein modifying the transmission setting includes changing a signal gain output by the first data concentrator.

11. The non-transitory computer readable medium of claim 10, wherein changing the signal gain includes increasing the signal gain.

12. The non-transitory computer readable medium of claim 8, wherein modifying the transmission setting includes changing a frequency output by the first data concentrator.

13. A computer implemented method, comprising:
    transmitting a transmit command to a first data concentrator to send out a predetermined signal of predetermined characteristics according to a transmission setting;
    receiving a received signal from at least one second data concentrator;
    determining if there are any signal transmission effects between the first data concentrator and the second data concentrator based on a comparison of the predetermined signal and the received signal; and
    receiving a scheduled start signal before transmitting the transmit command to cause the method to be executed according to a predetermined schedule.

14. A non-transitory computer readable medium, comprising computer executable instructions configured to cause a computer to perform the steps of a method, the method comprising:
    transmitting a transmit command to a first data concentrator to send out a predetermined signal of predetermined characteristics according to a transmission setting;
    receiving a received signal from at least one second data concentrator;
    determining if there are any signal transmission effects between the first data concentrator and the second data concentrator based on a comparison of the predetermined signal and the received signal; and
    receiving a scheduled start signal before transmitting the transmit command to cause the method to be executed according to a predetermined schedule.

* * * * *